(12) United States Patent
Pavlath (10) Patent No.: US 10,794,703 B1
(45) Date of Patent: Oct. 6, 2020

(54) FIBER OPTIC GYROSCOPE CONTROL SYSTEM USING SUB-TAU MODULATION

(71) Applicant: George Attila Pavlath, Oak Park, CA (US)

(72) Inventor: George Attila Pavlath, Oak Park, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 16/460,121

(22) Filed: Jul. 2, 2019

(51) Int. Cl.
 *G01C 19/72* (2006.01)
 *G01B 9/02* (2006.01)

(52) U.S. Cl.
 CPC .......... *G01C 19/726* (2013.01); *G01B 9/02* (2013.01); *G01C 19/721* (2013.01)

(58) Field of Classification Search
 CPC ...... G01C 19/00; G01C 19/72; G01C 19/721; G01C 19/722; G01C 19/726
 See application file for complete search history.

(56) References Cited

U.S. PATENT DOCUMENTS

| | | | |
|---|---|---|---|
| 4,796,993 A * | 1/1989 | Sonobe | G01C 19/72 356/463 |
| 4,948,252 A | 8/1990 | Cekorich | |
| 5,412,472 A * | 5/1995 | Okada | G01C 19/721 356/463 |
| 5,469,257 A | 11/1995 | Blake et al. | |
| 5,926,275 A | 7/1999 | Sanders et al. | |
| 6,204,921 B1 | 3/2001 | Strandjord et al. | |

OTHER PUBLICATIONS

Bergh, et al.: "An Overview of Fiber-Optic Gyroscopes"; Journal of Lightwave Technology, vol. LT-2, No. 2, Apr. 1984; pp. 91-107.

* cited by examiner

*Primary Examiner* — Jonathan M Hansen
(74) *Attorney, Agent, or Firm* — Tarolli, Sundheim, Covell & Tummino LLP (57) ABSTRACT

A system includes a modulation controller that generates a modulation output signal that is employed to generate a modulation output signal to control light signals in a fiber optic coil. The modulation controller receives light signal feedback from the fiberoptic coil and controls the light signals in the fiber optic coil with the modulation output signal based on the light signal feedback. A transit time clock in the modulation controller has a clock speed to control a time period of the modulation output signal generated by the modulation controller. The time period is set to a period less than an optical transit time, tau, of the light signals applied to the fiber optic coil and returned from the coil after being applied.

20 Claims, 7 Drawing Sheets

FIBER OPTIC GYROSCOPE CONTROL SYSTEM USING SUB-TAU MODULATION

TECHNICAL FIELD

This disclosure relates to control systems, and more particularly to a fiber optic gyroscope control system using sub-tau modulation.

BACKGROUND

Fiberoptic gyroscope (FOG) coils are generally controlled by one or more control lops where light traveling in opposite directions is applied to the coil to determine parameters such as rotation rate and angular position changes. The step duration for the modulation signal applied to the FOG is approximately equal to the optical transit time, tau. In some cases, random phase modulation (RPM) may be employed but in other cases different types of modulation can be utilized. In the case of RPM, an automatic gain control (AGC) loop is employed to maintain unity gain around the primary (rate) servo loop for the FOG which maximizes bandwidth. The bandwidth is generally driven by a three tau-delay in applying a new step in response to a gyro input. In the first tau period, the optical signal is integrated and converted by an AD converter. The second tau period is consumed processing the received gyro output and computing what the feedback step size should be which is then added to the appropriate modulation value. Typically, this new step size cannot be applied at the end of the second tau period and needs to wait until the end of the third tau period to be applied. As the gyro sensing coil lengths is made longer however, it is possible to apply the signal at the end of the second tau period but the delay still affects bandwidth and vibration sensitivity.

SUMMARY

This disclosure relates to a fiber optic gyroscope control system using sub-tau modulation. In one aspect, a system includes a modulation controller that generates a modulation output signal to control timing in the controller that is employed to generate a phase modulator output signal to control clockwise and counterclockwise output light signals applied to a fiber optic coil. The phase modulator output signal is generated to control a phase relationship between input light signals received from the fiber optic coil in response to the output light signals. The modulation controller receives the input light signals as feedback from the fiberoptic coil and adjusts the phase modulator output signal to null a phase shift between the clockwise and counterclockwise output light signals. The phase shift is in response to rotation of the fiber optic coil in the presence of the output light signals. A transit time clock in the modulation controller controls timing of the controller. The transit time clock is set to a clock speed to control a time period of the modulation output signal generated by the modulation controller. The time period is set to a period less than an optical transit time, tau, of the light signals applied to the fiber optic coil and returned as the input light signals as feedback from the coil after being applied.

In another aspect, a circuit includes a number generator that generates a modulation output signal that is employed to control modulation of light signals in a fiber optic coil. A transit time clock controls timing of the number generator. The transit time clock has a clock speed to control a time period of the modulation output signal generated by the number generator. The time period is set to a period less than an optical transit time, tau, for the light signals applied to the fiber optic coil and returned from the coil after being applied. A first loop demodulator receives a first delayed signal from the number generator and a feedback signal representing light from the fiber optic coil and generates a demodulated rate signal based on the first delayed signal and the feedback signal. The first delayed signal is delayed by a first time period adapted to the time period of the transit time clock. A second loop demodulator receives a reset signal and a second delayed signal representing the feedback signal and generates a scale factor correction signal for the light signals based on the reset signal and the second delayed signal.

In yet another aspect, a method includes generating a modulation output signal that is employed to control modulation of light signals in a fiber optic coil. The method includes generating a transit time clock to control timing of the modulation output signal. The transit time clock has a clock speed to control a time period of the modulation output signal. The time period is set to a period less than an optical transit time, tau, for the light signals applied to the fiber optic coil and returned from the coil after being applied. The time period tau is subdivided by an odd integer value and is set less than the next successive even integer value that is greater than the respective odd integer value or greater than the prior even integer. The method includes receiving a first delayed signal and a feedback signal representing light from the fiber optic coil. The method includes generating a rate signal based on processing the first delayed signal and the feedback signal. The method includes receiving a reset signal and a second delayed signal representing the feedback signal. The method includes generating a scale factor correction signal for the light signals based on the reset signal and the second delayed signal.

DETAILED DESCRIPTION

This disclosure relates to modulating and controlling light signals applied to and received from a fiber-optic gyroscope (FOG). The FOG's measure angular rotation using light transmitted through a fiber optic coil of the FOG and use the Sagnac effect to calculate the angular rotation. Two light beams are injected in opposite directions into the coil of the FOG. Due to the Sagnac effect, the light beam traveling against the rotation experiences a slightly shorter path delay than the other beam. The resulting difference (i.e., differential phase shift) can be used to calculate the angular velocity and rotation. During operation of the FOG, modulation output signals at calculated time increments referred to as sub-tau time periods are applied to the light beams in order to improve the performance (e.g., accuracy, bandwidth) of the gyroscope. Modulation output signals are applied at a beginning of a transit time period tau which refers to the time it takes for light to be applied to the fiber optic coil and returned from the coil after being applied. In conventional FOG's, the modulation time is approximately equal to the optical transit time tau. In the systems, circuits, and methods described herein, the modulation time is subdivided into increments that are less than tau and this is referred to as sub-tau modulation.

In order to determine the time increments for computing the modulation output signal, a random phase modulation (RPM) generator (or deterministic number generator) and an automatic gain control (AGC) loop are employed to maintain unity gain around a primary (rate) servo loop, which maximizes bandwidth for the light signals provided to and received from the FOG. Thus, bandwidth is dependent on the delay in applying a new computation and computational step for the generation of the modulation output signal in a given time increment in response to a FOG input (the longer the delay, the smaller the bandwidth). In applying the next computational increment, the optical signal received from the FOG is integrated and converted by an AD converter. This conventionally occurs over one transit time period tau. The signal is then processed to determine the feedback increment size and which conventionally occurs over a second period tau. The next calculated increment cannot generally be applied at the end of the second period tau and waits until the end of the third period tau to be applied. This delay that is several multiples of the tau time period reduces the bandwidth of the FOG in conventional systems making them more sensitive to environmental conditions (e.g. vibration, shock, and so forth).

In the present disclosure, higher odd harmonics (e.g., 3rd harmonic, 5th harmonic, 7th harmonic, or numbers between the odd harmonics not including even harmonics) of the fundamental transit time period tau can be applied to the modulation output signal to increase bandwidth of the FOG control loop and to provide substantial reduction in vibration sensitivity. For example, if using the 3rd harmonic as the modulation time period, the time period would be computed as tau/3 in one example. So, in a 3 km coil for a FOG, where the transit time period tau is 15 microseconds, the modulation computational increment could be applied at 15/3 or 5 microseconds if the example tau/3 were selected. Instead of processing over one full period tau as in conventional control systems (e.g. over 15 microseconds in this example), it now processes one period divided by an odd integer value (e.g., tau/3, tau/5, tau/7, and so forth). The modulation signal is then processed to determine the feedback step size. Instead of this processing occurring over a second full period tau as in conventional systems, the systems and circuits described herein utilize one period divided by a respective odd integer value. As a result of subdividing the computational time period for computing the next modulation output signal to the FOG, the bandwidth is improved by the value that tau is divided by (e.g., sub-tau modulation) since the control loops described herein can operate at a higher rate of speed for generating the next light signals to operate the FOG. The vibration sensitivity is also reduced accordingly by subdividing tau.

Figure 1:
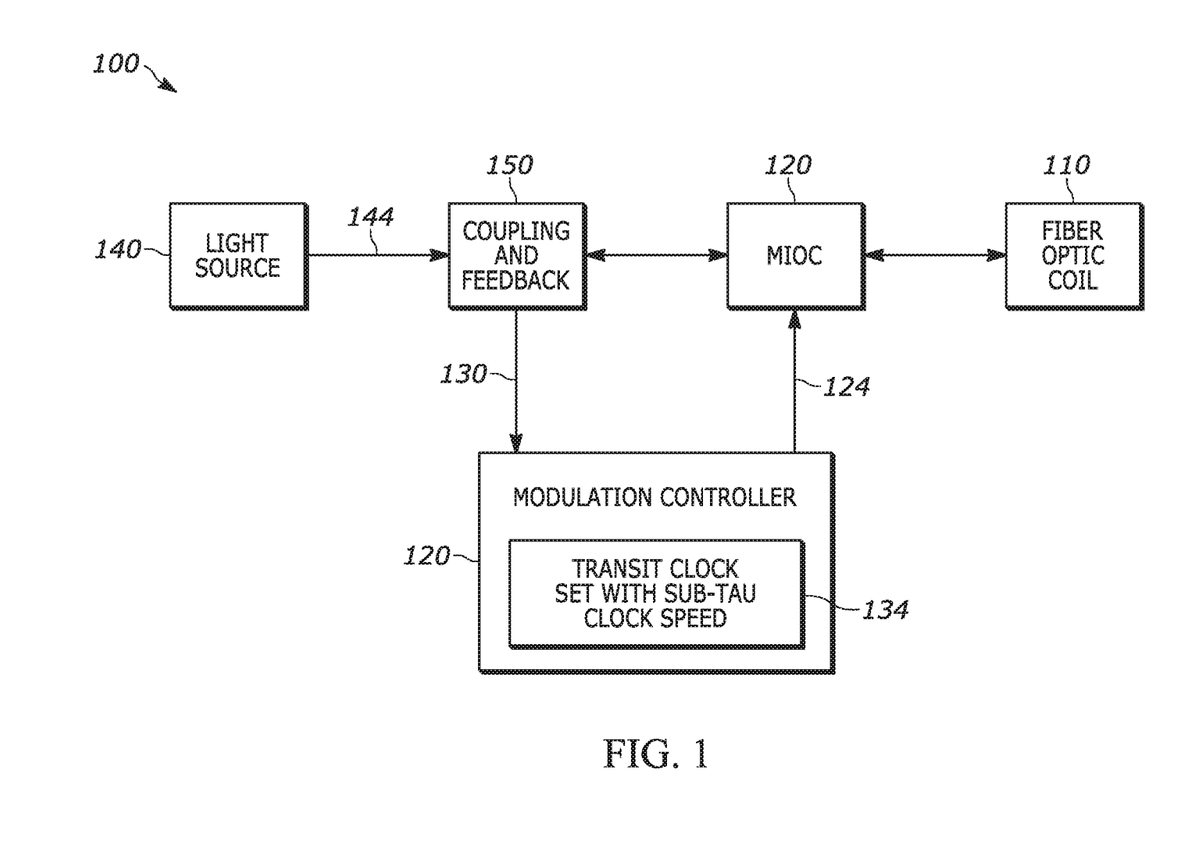
FIG. 1 illustrates a block diagram of an example system that employs sub-tau modulation to control light signals applied to and received from a fiber optic coil.

FIG. 1 illustrates a block diagram of an example system 100 that employs sub-tau modulation to control light signals applied to and received from a fiber optic coil 110. The system 100 includes a modulation controller 120 that generates a modulation output signal that is employed to generate a phase modulator output signal 124 to control output light signals in the fiber optic coil 110. The phase modulator output signal 124 is generated to control a phase relationship between input light signals received from the fiber optic coil 110 in response to the output light signals. The modulation controller 120 receives the input light signals as feedback 130 from the fiberoptic coil and adjusts the phase modulator output signal 124 to null a phase shift between clockwise and counterclockwise output light signals. The phase shift is in response to a rotation of the fiber optic coil 110 in the presence of the output light signals. A transit time clock 134 in the modulation controller 120 controls timing of the controller. The transit time clock 134 is set to a clock speed to control a time period of the modulation output signal generated by the modulation controller. The time period is set to a period less than an optical transit time, tau, of the light signals applied to the fiber optic coil 110 and returned as the input light signals as feedback 130 from the coil after being applied.

Setting the time period for the transit clock 134 is referred to as sub-tau modulation. By increasing the transit clock speed (e.g., reducing the incremental times to generate the next modulation output signal), the system 100 provides improved bandwidth over conventional systems that are based on tau as its computational time frame since overall loop closure speeds can be increased due to the increased clock speeds. Also, by utilizing sub-tau modulation as described herein, vibration sensitivity with respect to the fiber optic coil over environmental conditions such as shock and temperature are reduced due to the increased loop closure time.

As shown, light is generated from a light source 140 which is can be a laser source such as a laser diode or a super-luminescent diode, for example. Light output 144 from the light source 140 is provided to a coupling and feedback network 150 (e.g., 2×1 coupler) where some of the light from the light source is passed to a multifunction integrated optics chip (MIOC) 160 and used to generate modulated light signals to the fiber optic coil 110. After light has traveled through the fiber optic coil 110 taking one transit time referred herein as tau, it passes back through the MIOC 150 where it is re-modulated and passed to the coupling and feedback network 150 where the returned light from the fiber optic coil is diverted as the feedback signal 130 provided to the modulation controller 120. A photodiode (not shown, see e.g., FIG. 3) in the feedback loop receiving the light signal 130 converts the light signal to an electrical signal for further processing by the modulation controller 120.

In one example, the modulation controller 120 includes a random or pseudo random number generator (see e.g., FIG. 3) to generate the modulation output signal based on a random or pseudo random number sequence. Random number generation is used to mitigate disturbance caused by the much larger phase modulator output signal 124 (e.g., several volts) from causing interference with the much smaller feedback signal 130 (e.g., a microvolt). The time period in a random number example can be subdivided by an odd integer value and is set less than the next successive even integer value greater than the respective odd integer value. For example, the time period can be set as tau/3, tau/5. tau/7, tau/9, and so forth. Even integer value divisions are generally not selected as that can cause phase cancellation between the light signals generated to the fiber optic coil 110 and the light signals received therefrom in response to the generated signals. However, subdivisions such as tau/3.2, tau/5.45. tau/7.86 are possible however, such increments beyond the odd integer subdivision can result in less feedback signal received from the fiber optic coil 110 due to phase cancellation.

In another example, the modulation controller 120 can include a deterministic number generator (see e.g., FIG. 6) to generate the modulation output signal based on a predetermined high and low sequence number sequence (e.g., square wave or some other deterministic value having relatively equal high and low periods for the time period. In this example, the time period of this deterministic modulation pattern is defined as Nsubtau, where N is an integer greater than or equal to 2 where tau is subdivided by an odd integer value and is set less than the next successive even integer value greater than the respective odd integer value. For example, in a square wave deterministic generator where N is 2 and thus having a period of 2tau, sub-tau clock speed settings can include tau/3, tau/5. tau/7, tau/9, and so forth. For other deterministic systems that employ other than a 2tau square wave situation defining a respective period, sub-tau clock speed settings can be extended to the general case of tau/3, tau/5. tau/7, tau/9, and so forth. Similar to the random number example, subdivisions such as tau/3.36, tau/5.64, and tau/7.23, for example, are also possible.

Figure 2:
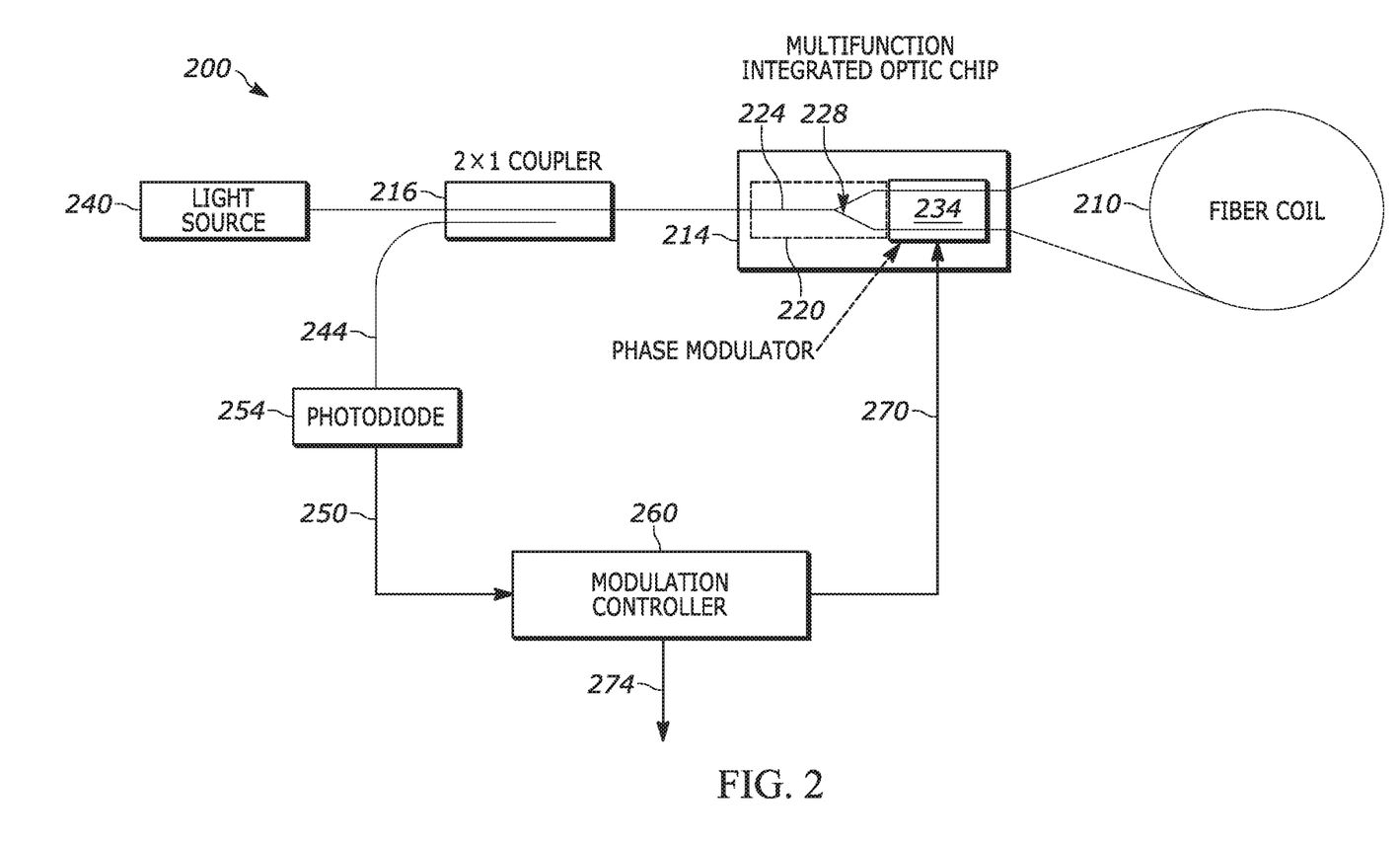
FIG. 2 illustrates an example system for controlling light paths in a fiber optic gyroscope using sub-tau modulation.

FIG. 2 illustrates an example system 200 for controlling light paths in a fiber optic gyroscope using sub-tau modulation. A fiber optic coil 210 is driven from a multifunction integrated optic chip (MIOC) 214 which is an integrated circuit having optical paths in addition to electrical control paths for controlling light in the fiber optic coil. Light from a 2×1 coupler 216 is received by a waveguide 220 which includes a polarizer 224 shown as a straight portion and feeds a y-junction coupler 228 that separates a single polarized beam of light into two beams. After splitting, the beams are modulated by a phase modulator 234 and provided to the fiber optic coil 210. The 2×1 coupler 216 is driven by a light source 240 and provides light to drive the fiber optic coil 210 in one portion of the coupler. The 2×1 coupler 216 in one example can be set for a 50/50 ratio where light out of the coupler is approximately 50 percent less than the light received from the light source 240.

Light received on its return path from the fiber optic coil 210 is passed through the other portion of the 2×1 coupler (at about 50 percent reduced) as light feedback 244 that is converted to an electrical signal 250 by a photodiode 254. A modulation controller 260 processes the electrical signal 250 and drives the phase modulator 234 in the MIOC 214 via a phase modulation output signal 270 (or signals). The phase modulation output signal 270 allows for loop closure and modulation with respect to light signals driving the fiber optic coil 210 and light signals returned from the fiber optic coil 210 via the phase modulator 234 and MIOC 214. The modulation controller 260 also generates a rate output signal 274 that can be processed by other systems (not shown).

Figure 3:
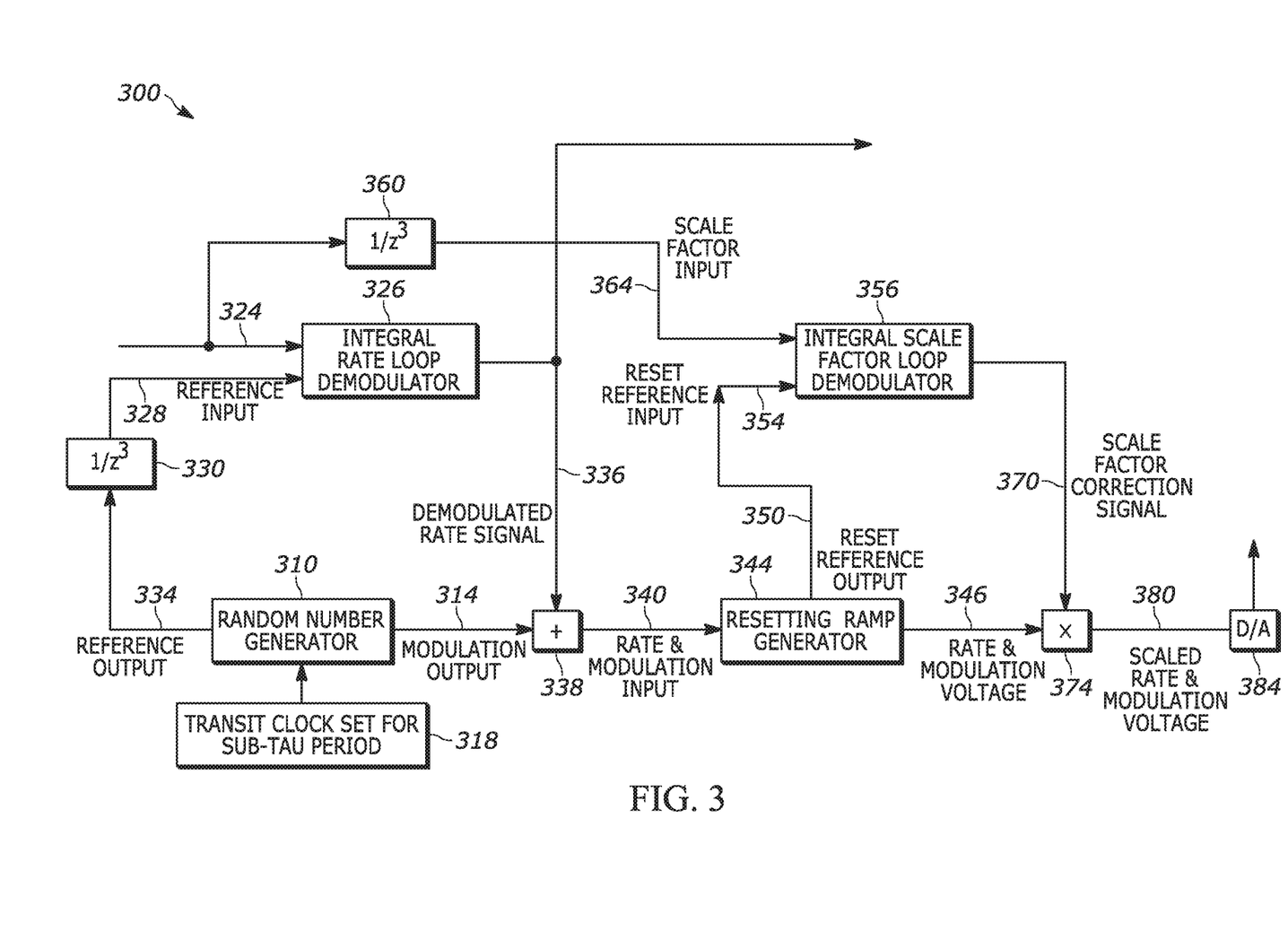
FIG. 3 illustrates an example of a modulation controller that employs sub-tau modulation.

FIG. 3 illustrates a modulation controller 300 that employs sub-tau modulation to modulate and control light signals to and from a fiber optic coil. In one example, the modulation controller 300 can be implemented as an electro-optical integrated circuit and in other examples as a system that may include one or more of the circuits shown in FIG. 3. A pseudo random number generator 310 provides a modulation output signal 314 that is a pseudo random step up or step down based on a transit clock 318 which is set at a sub multiple of the optical transit time which is referred to as tau. As used herein, the term optical transit time tau refers to the time it takes for light to enter and be returned from the fiber optic coil such as shown at 210 of FIG. 2. The modulation output signal 314 is provided according to a pseudo random sequence (or random sequence) by the pseudo random number generator 310 which can be a function of a tap delay line which causes eventual repeating of output signal patterns. As shown, a transit time clock 318 drives the pseudo random number generator 310 which sets the timing for the modulation controller 300. The transit time clock 318 is set for a period of less than tau (e.g., tau/3, tau/5, tau/7), where tau is the time it takes to transmit and receive light through the fiber optic coil.

Light signal feedback from the fiber optic coil is received as an electrical signal at 324 (e.g., received from photodiode) at an integral rate loop demodulator 326 and also provided to a time delay element 360 which is set at $z^{-3}$ where z is adapted ($z^{-3}$) approximately equal to the subdivided tau value which is the transit time (to synchronize modulation controller in light of increased transit clock speeds) of light entering and returning from the fiber optic loop. The integral rate loop demodulator 326 performs an integral function on the electrical signal 324 as it demodulates the electrical signal. Although an integral rate loop demodulator is shown and described herein, other functions can be implemented to perform signal processing at the first and/or second demodulator stages. For example, these respective stages can be implemented as at least one of a proportional controller, a derivative controller, an integral controller, a proportional-integral controller (PI) or a proportional-integral-derivative (PID) controller to perform demodulation. The integral rate loop demodulator 326 receives a reference input signal 328 which is delayed by a time delay element 330 that is based on a sub-divided transit time tau shown as ($z^{-3}$). The reference output 334 is provided by the pseudo random number generator 310 to drive the time delay element 330 from which the reference input signal 328 is derived.

An output signal 336 (e.g., demodulated rate signal) from the integral rate loop demodulator 326 is provided to an adder 338 (e.g., adder circuit or digital adder) which provides a rate and modulation output signal 340 to a resetting ramp generator 344. The resetting ramp generator 344 can be N number of bits (e.g., 12 to 16) and generates stair-case like (ramp up or ramp down between some maximum and minimum number) rate and modulation output voltage at 346, where N is a positive integer. The resetting ramp generator 344 also generates a reset reference output signal 350 which is received at reset reference input 354 of an integral scale factor loop demodulator 356 (e.g., or other type including proportional, derivative, proportional/derivative, or proportional-integral-derivative (PID) control functions or circuits). The reset reference output signal 350 is a number that is 1 or −1, where 1 represents a positive overflow (generator has maxed out) of the resetting ramp generator 344 and −1 represents an underflow (generators minimum value has been reached). Similarly, the reference output signal 334 is a value representing 1 or −1 depending on whether the output of the pseudo random number 310 is a step up or a step down. The integral scale factor loop demodulator 356 also receives a delayed version of the electrical signal 324 from the time delay element 360 at input 364 where the delay is set for a subdivided tau period. The integral scale factor loop demodulator 356 is similar in function to the integral rate loop demodulator 326 which multiplies its respective inputs and runs a continuing summing operation to perform integration after the multiplication. A scale factor correction signal 370 (e.g., a number near the value of 1 to correct for errors over temperature or age) is generated by the integral scale factor loop demodulator 356 and provided to a multiplier 374 (e.g., analog or digital circuit to perform multiplication) which is multiplied by the rate and modulation voltage 346 to provide a scaled rate and modulation voltage 380. The scaled rate and modulation voltage 380 can be provided to a digital to analog converter 384 output from which can be applied as signal 270 to the phase modulator 234 of FIG. 2.

Figure 4:
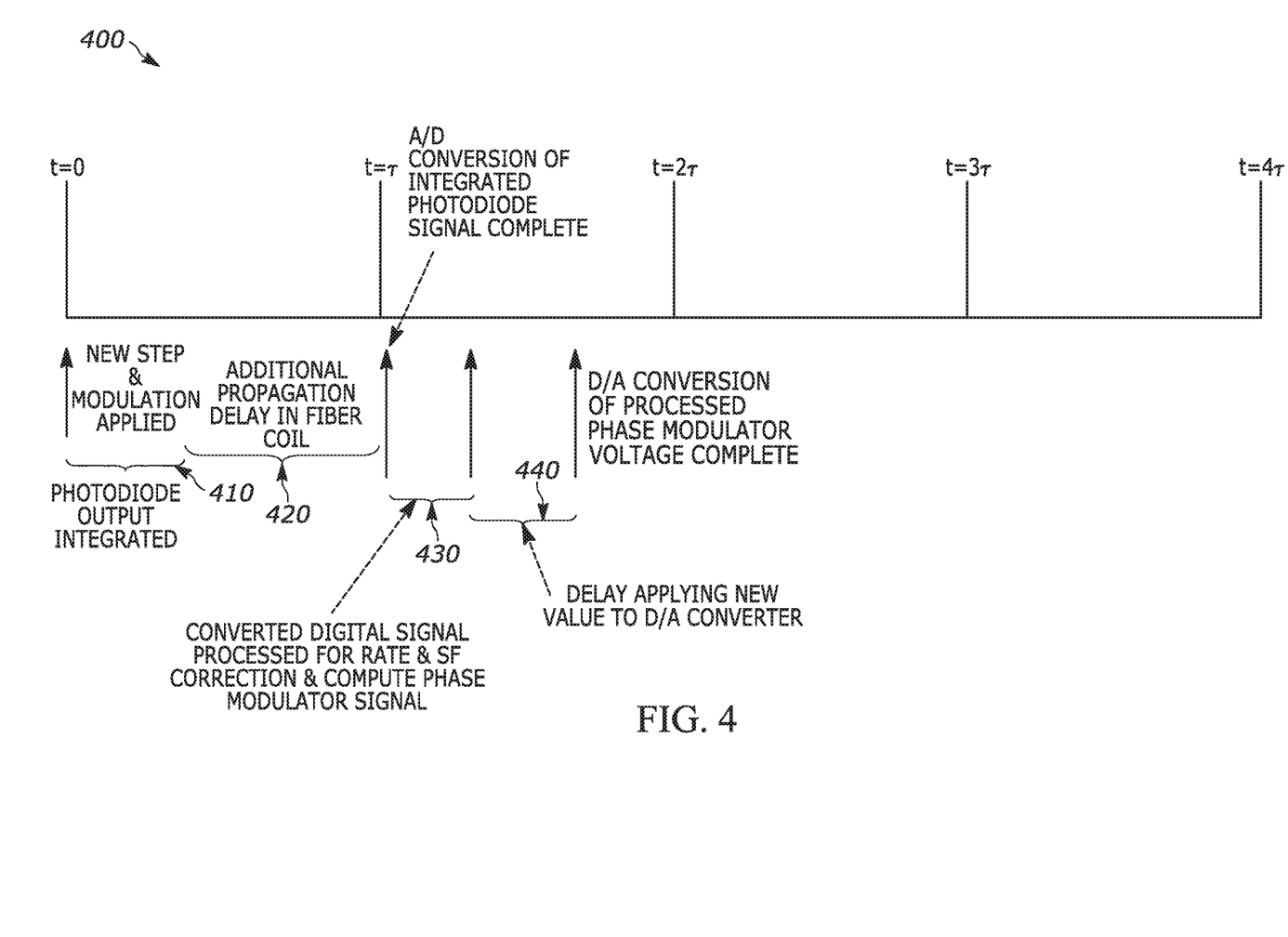
FIG. 4 illustrates an example timing diagram for the modulation controller depicted in FIG. 3.

FIG. 4 illustrates an example timing diagram 400 for the modulation controller that employs sub-tau modulation as depicted in FIG. 3. Time is represented along the horizontal axis and delineated starting at time t=0, time t=tau (tau represented in seconds), t=2tau, t=3tau, and t=4tau. At time t=0 a new step and modulation (from output 384 of FIG. 3) is applied to the phase modulator described herein and the photodiode output representing received light from the fiber optic coil is integrated from time t=0 to time t=tau/3 which in this example is a fraction of tau referred to as sub-tau (e.g., tau/3, tau/5, tau/7, tau/3.5 and so forth) and runs for a period shown at reference numeral 410. During time period shown at 420, which is still less than tau seconds, a propagation delay occurs waiting for light to return from the fiber optic coil which takes tau seconds.

Shortly after time t=tau, an analog to digital conversion (A/D) of the photodiode signal is completed. From the completion of the A/D signal shortly after t=tau, the converted digital signal is processed for rate and scale factor correction and the phase modulator signal is computed after t=tau during time period shown at 430 which in this example occurs at time tau/3 after time period tau as started. At time period shown at 440, a delay occurs applying a new value to the D/A converter which receives output signal 380 from multiplier 374. After time period 440 has completed which is less than 2tau and occurs two tau/3 periods after t=tau in this example, the D/A conversion is completed and applied as the new phase modulator control signal to the phase modulator 234 of FIG. 2.

After time period 440 has completed which is less than 2tau and occurs two tau/3 periods, the time sequence repeats to drive the fiber optic coil in another sequence. The bandwidth of the modulation controller 300 is thus basically represented as tau plus 2 tau/3 delays as shown after 440 time period of FIG. 4 which represents sub-tau modulation processing and timing for the systems of FIGS. 1, 2, and 3 described herein. By increasing the rate at which the modulation, ramps, and demodulation signals are generated and processed, the bandwidth of the system is increased over prior systems. The increase in bandwidth over prior systems is illustrated in FIG. 5 which increases as the transit clock processing speed is increased thus reducing the time in between tau periods in which modulation and processing of light signals is processed.

Figure 5:
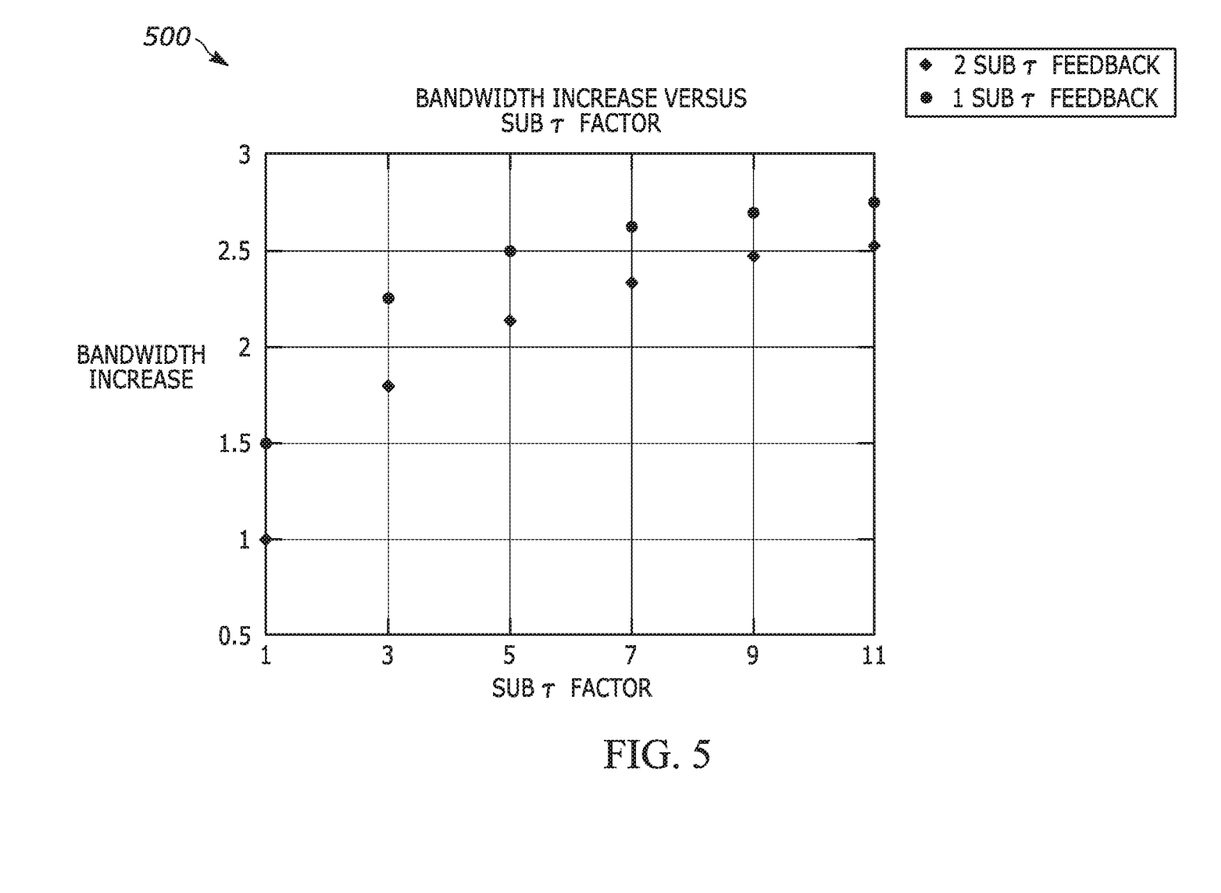
FIG. 5 illustrates an example diagram for increasing bandwidth of a fiberoptic gyro system using different values for sub-tau modulation.

FIG. 5 illustrates an example diagram 500 for increasing bandwidth of a fiberoptic gyro system using different values for sub-tau modulation. The odd-harmonic sub-tau values in seconds are represented along the horizontal axis of the diagram 500 and bandwidth increases are shown on the vertical axis. At tau=3, the bandwidth (BW) is 1.75 using 2 sub-tau feedback and is 2.25 using 1 sub-tau feedback. At tau=5, the bandwidth (BW) is about 2.2 using 2 sub-tau feedback and is about 2.50 using 1 sub-tau feedback. At tau=7, the bandwidth (BW) is about 2.35 using 2 sub-tau feedback and is about 2.60 using 1 sub-tau feedback. The BW continues to improve as the sub-tau setting is increased however, a limitation of the transit time through the fiber optic coil introduces wait delays in the system waiting for light to return from the coil. Thus, as the sub-tau factor is increased, the increase in BW begins to roll-off due to the wait-time of the fiber-optic coil.

Figure 6:
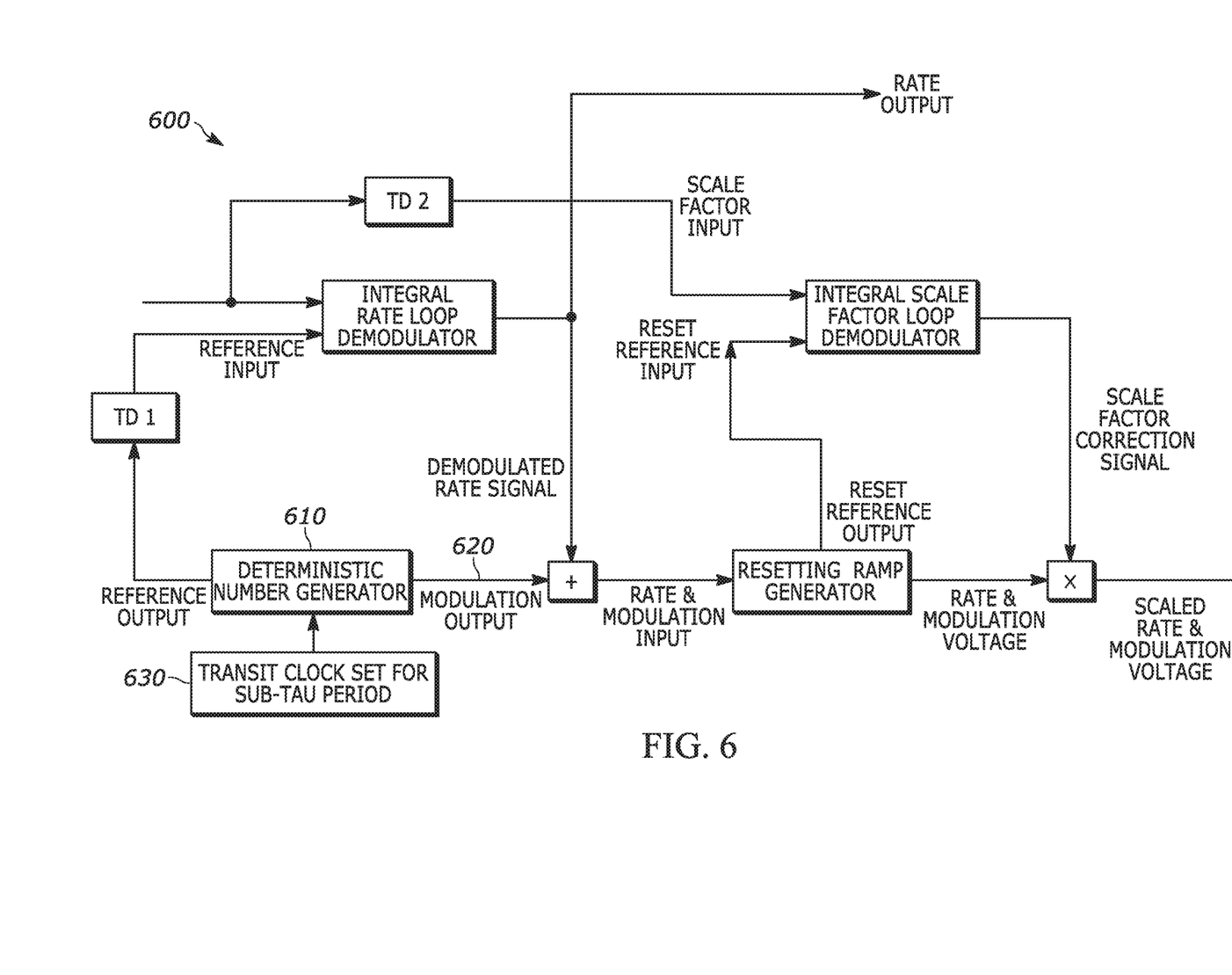
FIG. 6 illustrates an example of a modulation controller that employs a deterministic number generator using sub-tau modulation.

FIG. 6 illustrates an example of a modulation controller 600 that employs a deterministic number generator 610 using sub-tau modulation. For purposes of brevity, each component of FIG. 6 will not be described but also function similarly to the description of FIG. 3. The modulation controller 600 can include the deterministic number generator 610 to generate a modulation output signal 620 based on a predetermined high and low sequence number sequence (e.g., square wave or some other deterministic value having relatively equal high and low periods for the time period). The deterministic number generator 610 is clocked by a transit clock 630 set for sub-tau speeds as described herein. In this example, the time period for the transit clock 630 is defined as sub tau, where sub tau is tau divided by an odd integer value and that is greater than the respective odd integer value or greater than the prior even integer value. For example, in a square wave deterministic generator where N is 2 and thus having a period of 2tau, sub-tau clock speed settings can include tau/3, tau/5. tau/7, tau/9, and so forth.

For other deterministic systems that employ other than a 2tau square wave situation defining a respective period, sub-tau clock speed settings can be extended to the general case of tau/3, tau/5. tau/7, tau/9, and so forth. Similar to the random number example, subdivisions such as tau/3.36, tau/5.64, and tau/7.23, for example, are also possible. It is noted that for deterministic modulation, time delay elements TD1 and TD2 are provided and similar to phase compensators 330 and 360 shown with respect to FIG. 3 synchronize the reference signals with the fiber optic gyro outputs.

Figure 7:
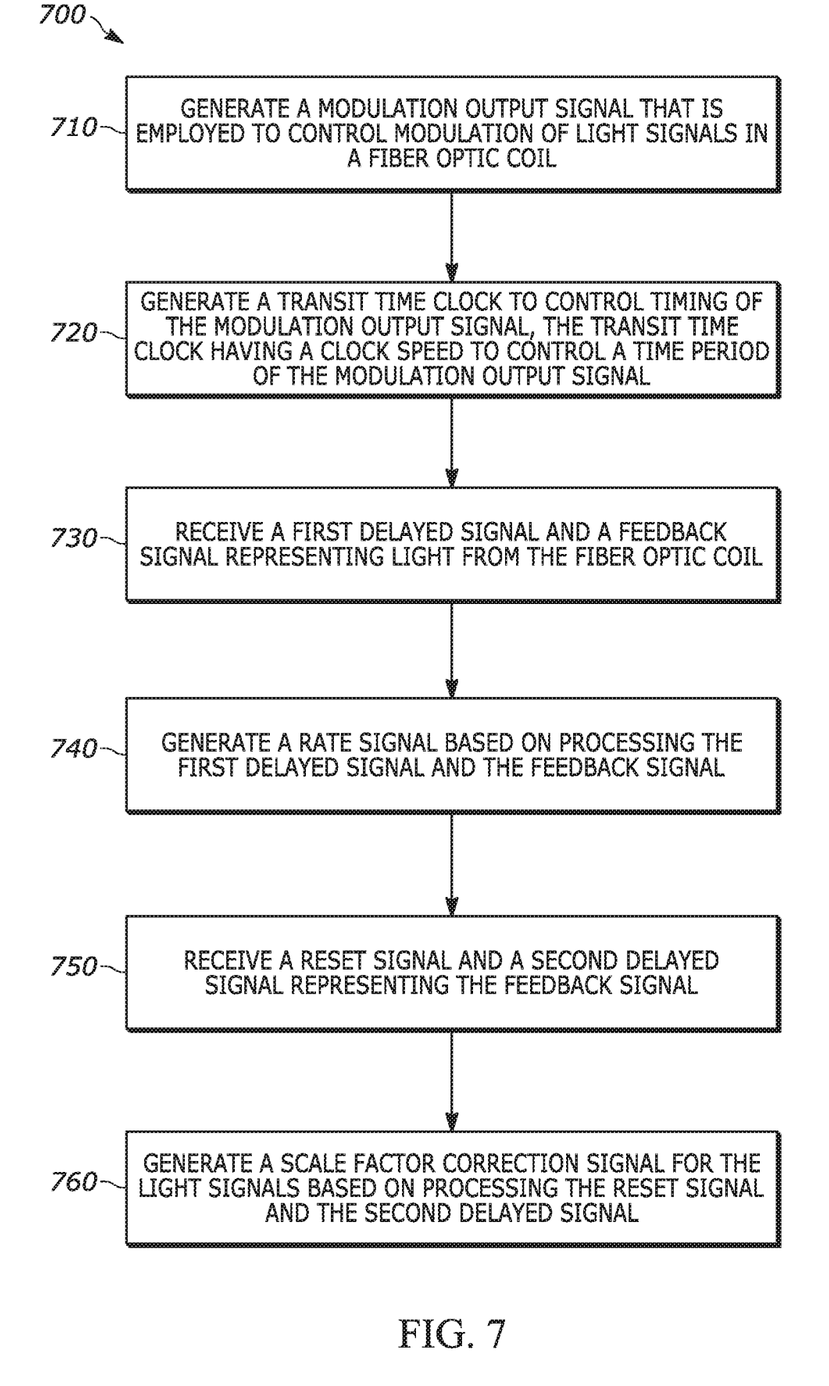
FIG. 7 illustrates an example method that employs sub-tau modulation to modulate and control light signals to and from a fiber optic coil.

In view of the foregoing structural and functional features described above, an example method will be better appreciated with reference to FIG. 7. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components configured in an integrated circuit, processor, or a controller, for example.

FIG. 7 illustrates an example method 700 that employs sub-tau modulation to modulate and control light signals to and from a fiber optic coil. At 710, the method 770 includes generating a modulation output signal that is employed to control modulation of light signals in a fiber optic coil (e.g., via generator 310 of FIG. 3 or generator 610 of FIG. 6. At 720, the method 700 includes generating a transit time clock to control timing of the modulation output signal (e.g., via transit clock 134 of FIG. 1). The transit time clock has a clock speed to control a time period of the modulation output signal. The time period is set to a period less than an optical transit time tau for the light signals applied to the fiber optic coil and returned from the coil after being applied. The time period tau is subdivided is subdivided by an odd integer value and is set less than the next successive even integer value greater than the respective odd integer value or set greater than the prior even integer value.

At 730, the method 700 includes receiving a first delayed signal (via time delay element 330 of FIG. 3) and a feedback signal representing light from the fiber optic coil. At 740, the method 700 includes generating a demodulated rate signal based on integrating the first delayed signal and the feedback signal (e.g., via demodulator 626 of FIG. 3). At 750, the method 700 includes receiving a reset signal and a second delayed signal (via time delay element 360 of FIG. 3) representing the feedback signal. At 760, the method 700 includes generating a scale factor correction signal for the light signals based on integrating the reset signal and the second delayed signal (e.g., via demodulator 356 of FIG. 3) The method 700 can also include adjusting a delay for the first delayed signal and the second delayed signal according to a period of the transmit time clock.

What has been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system, comprising:
   a modulation controller that generates a modulation output signal to control timing in the modulation controller that is employed to generate a phase modulator output signal to control clockwise and counterclockwise output light signals applied to a fiber optic coil, the phase modulator output signal is generated to control a phase relationship between input light signals received from the fiber optic coil in response to the output light signals, the modulation controller receives the input light signals as feedback from the fiberoptic coil and adjusts the phase modulator output signal to null a phase shift between the clockwise and counterclockwise output light signals, wherein the phase shift is in response to rotation of the fiber optic coil in the presence of the output light signals; and
   a transit time clock in the modulation controller to control timing of the controller, the transit time clock is set to a clock speed to control a time period of the modulation output signal generated by the modulation controller, wherein the time period is subdivided by an odd integer value and is set to a period less than an optical transit time, tau, of the light signals applied to the fiber optic coil and returned as the input light signals as feedback from the coil after being applied.

2. The system of claim 1, wherein the modulation controller further comprises a random or pseudo random number generator to generate the modulation output signal based on a random or pseudo random number sequence and the transmit time clock, wherein the time period is set less than the next successive even integer value greater than the respective odd integer value or set greater than the prior even integer value.

3. The system of claim 1, wherein the modulation controller further comprises a deterministic number generator to generate the modulation output signal based on a predetermined high and low sequence number sequence for the time period, wherein the time period is defined as Nsubtau, where N is an integer greater than 2 and subtau is tau subdivided by the odd integer value and is set less than the next successive even integer value greater than the respective odd integer value or set greater than the prior even integer value.

4. The system of claim 2, further comprising a first loop demodulator that receives a first delayed signal from the random number generator and a feedback signal representing light from the fiber optic coil, wherein the first loop demodulator generates a demodulated rate signal based on the first delayed signal and the feedback signal.

5. The system of claim 4, further comprising a first time delay element to provide the first delayed signal based on a reference output from the random number generator, wherein a delay of the first delayed signal is set to a first time period adapted to the time period of the transit time clock.

6. The system of claim 5, further comprising a second loop demodulator that receives a reset signal and a second delayed signal representing the feedback signal and generates a scale factor correction signal for the light signals based on the reset signal and the second delayed signal.

7. The system of claim 6, further comprising a second time delay element to provide the second delayed signal based on the on the feedback signal, wherein a delay of the second feedback signal is set to a second time period adapted to the time period of the transit time clock.

8. The system of claim 7, further comprising a resetting ramp generator to generate the reset signal to the second loop demodulator based on the modulation output signal from the random number generator that is added to an output from the first loop demodulator.

9. The system of claim 8, wherein the first loop demodulator and the second loop demodulator perform a multiplication of signals received at the respective inputs to the demodulators and perform an integration by performing a running sum in the respective demodulators based on the multiplication at the respective inputs.

10. The system of claim 8, wherein the first loop demodulator or the second loop demodulator include at least one of a proportional controller, a derivative controller, an integral controller, a proportional-integral controller (PI) or a proportional-integral-derivative (PID) controller to perform demodulation.

11. The system of claim 9, further comprising a multiplier circuit to multiply a rate and modulation voltage from the resetting ramp generator with a scale factor correction output voltage from the second loop demodulator to generate a scaled rate and modulation voltage.

12. The system of claim 11, further comprising a digital to analog converter (DAC) to generate the phase modulator output signal based on the scaled rate and modulation voltage.

13. The system of claim 12, further comprising a multifunction integrated optic chip to modulate the light signals to the fiber optics coil based on the phase modulator output signal from the DAC.

14. A circuit, comprising:
   a number generator that generates a modulation output signal that is employed to control modulation of light signals in a fiber optic coil;
   a transit time clock to control timing of the number generator, the transit time clock having a clock speed to control a time period of the modulation output signal generated by the number generator, wherein the time period is set to a period less than an optical transit time tau for the light signals applied to the fiber optic coil and returned from the coil after being applied;
   a first loop demodulator that receives a first delayed signal from the number generator and a feedback signal representing light from the fiber optic coil and generates a demodulated rate signal based on the first delayed signal and the feedback signal, wherein the first delayed signal is delayed by a first time period adapted to the time period of the transit time clock; and a second loop demodulator that receives a reset signal and a second delayed signal representing the feedback signal and generates a scale factor correction signal for the light signals based on the reset signal and the second delayed signal.

15. The circuit of claim 14, wherein the number generator is a random or pseudo random number generator to generate the modulation output signal based on a random or pseudo random number sequence, wherein the time period is subdivided by an odd integer value and is set less than the next successive even integer value greater than the respective odd integer value.

16. The circuit of claim 14, wherein the number generator is a deterministic number generator to generate the modulation output signal based on a predetermined high and low sequence number sequence for the time period, wherein the time period is defined as Nsubtau, where N is an integer greater than 2 and subtau is subdivided by an odd integer value and is set less than the next successive even integer value greater than the respective odd integer value or set greater than the prior even integer value.

17. The circuit of claim 14, further comprising a resetting ramp generator to generate the reset signal to the second loop demodulator based on the modulation output signal from the number generator that is added to the demodulated rate signal from the first loop demodulator.

18. The circuit of claim 17, wherein the first loop demodulator and the second loop demodulator are implemented as at least one of a proportional controller, a derivative controller, an integral controller, a proportional-integral controller (PI) or a proportional-integral-derivative (PID) controller to perform demodulation.

19. A method, comprising:

generating a modulation output signal that is employed to control modulation of light signals in a fiber optic coil;

generating a transit time clock to control timing of the modulation output signal, the transit time clock having a clock speed to control a time period of the modulation output signal, wherein the time period is set to a period less than an optical transit time tau for the light signals applied to the fiber optic coil and returned from the coil after being applied, the time period tau is subdivided by an odd integer value and is set less than the next successive even integer value greater than the respective odd integer value or greater than the prior even integer;

receiving a first delayed signal and a feedback signal representing light from the fiber optic coil;

generating a rate signal based on processing the first delayed signal and the feedback signal;

receiving a reset signal and a second delayed signal representing the feedback signal; and generating a scale factor correction signal for the light signals based on processing the reset signal and the second delayed signal.

20. The method of claim 19, further comprising adjusting a delay for the first delayed signal and the second delayed signal according to a period of the transmit time clock.

* * * * *